US012531850B2

(12) United States Patent
Allen et al.

(10) Patent No.: US 12,531,850 B2
(45) Date of Patent: Jan. 20, 2026

(54) SECURE SCALABLE BI-DIRECTIONAL COMMAND AND CONTROL ACROSS NETWORKS

(71) Applicant: VMware LLC, Palo Alto, CA (US)

(72) Inventors: Paul Allen, Seattle, WA (US); John Calixto, Seattle, WA (US)

(73) Assignee: VMware LLC, Palo Alto, CA (US)

( * ) Notice: Subject to any disclaimer, the term of this patent is extended or adjusted under 35 U.S.C. 154(b) by 270 days.

(21) Appl. No.: 17/808,366

(22) Filed: Jun. 23, 2022

(65) Prior Publication Data

US 2023/0421549 A1 Dec. 28, 2023

(51) Int. Cl.
*H04L 9/40* (2022.01)
*H04L 67/56* (2022.01)
*H04L 69/08* (2022.01)

(52) U.S. Cl.
CPC ............ *H04L 63/083* (2013.01); *H04L 67/56* (2022.05); *H04L 69/08* (2013.01)

(58) Field of Classification Search
CPC ....... H04L 63/083; H04L 67/56; H04L 69/08; H04L 63/028; H04L 63/20
USPC .......................................................... 706/7
See application file for complete search history.

(56) References Cited

U.S. PATENT DOCUMENTS

| 10,154,007 B1* | 12/2018 | Viswanathan | .......... H04L 63/20 |
| 2015/0205596 A1* | 7/2015 | Hiltegen | ................... G06F 8/60 |
| | | | 717/172 |
| 2018/0337931 A1* | 11/2018 | Hermoni | ............. H04L 63/0823 |

OTHER PUBLICATIONS

VMWare: Secure State, Auto-Remediation Feature; Product Released Feb. 19, 2021.

* cited by examiner

*Primary Examiner* — Tan Doan
(74) *Attorney, Agent, or Firm* — King Intellectual Asset Management

(57) ABSTRACT

The disclosure provides an approach for inter-network command and control. Embodiments include receiving, by a proxy component of a service, from an agent of the service, a request to retrieve one or more action definitions. The agent may be located in a private networking environment, and the proxy component may be located in a networking environment external to the private networking environment. Embodiments include retrieving, by the proxy component, based on the request, the one or more action definitions from a queue associated with the service using a credential of the proxy component. Embodiments include providing, by the proxy component, the one or more action definitions to the agent. Embodiments include performing, by the agent, one or more actions within the private networking environment based on the one or more action definitions.

20 Claims, 4 Drawing Sheets

SECURE SCALABLE BI-DIRECTIONAL COMMAND AND CONTROL ACROSS NETWORKS

BACKGROUND

While enterprises often maintain private networking environments such as data centers, there is an increasing reliance on services provided from outside such private networking environments, such as running in clouds. In some cases, it may be advantageous to allow a service located outside a private networking environment to perform actions within the private networking environment, such as for remediation of issues.

Providing credentials for accessing resources within private networking environments to outside services can present security and scalability issues. For example, it can be difficult to limit actions performed by such outside services within the private networking environment, and it may be challenging to ensure that the credentials are not shared or maliciously accessed by other entities via the outside service. Furthermore, providing more limited or targeted access to private networking environments by modifying or configuring firewalls and other security components can be complex, time-consuming, and difficult to scale.

As such, there is a need in the art for improved methods of allowing outside services to perform actions within private networking environments.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
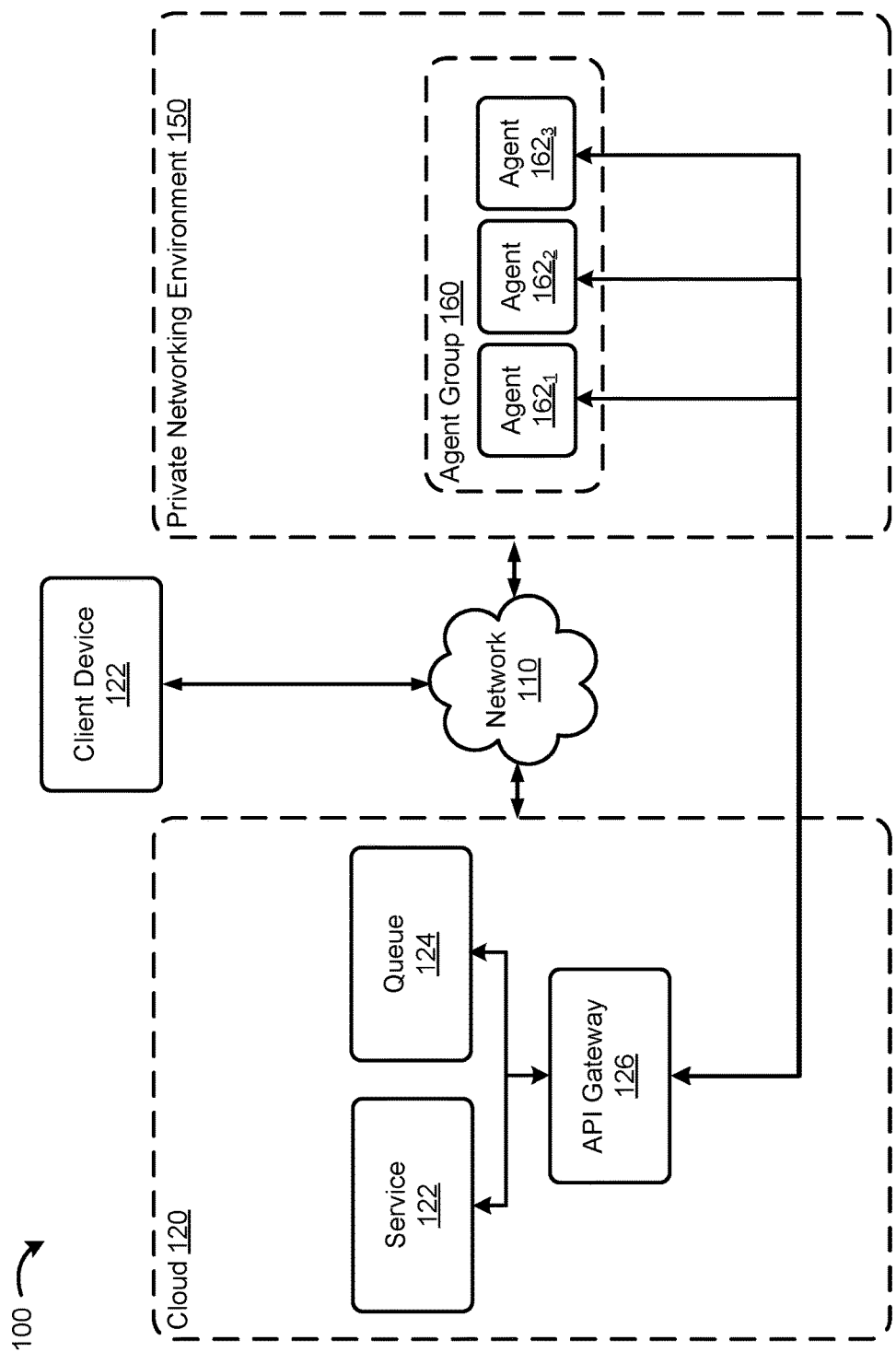
FIG. 1 illustrates an example related to inter-network command and control.

The present disclosure provides an approach for inter-network command and control. For example, embodiments described herein involve allowing a remotely-located service to perform specifically-defined actions within a private networking environment such as a data center or private cloud by running agents of the remotely-located service within the private data center. For example, each agent of the service may register with the service upon being instantiated within the private networking environment, and may provide information to the service for authentication (e.g., a token generated by the service and provided to a user that installs the agent).

The service may then perform "command and control" of actions in the private data center, such as actions to automatically remediate issues occurring in the private networking environment. In particular, a queue may be used by the service to provide action definitions to agents of the service, and agents may retrieve these action definitions from the queue in order to determine which actions to perform. The action definitions may correspond to logic contained within the agents themselves. In some embodiments, each agent provides its code for performing actions to the service upon instantiation, and the service generates a checksum of the code. The service may associate a corresponding checksum with each action definition for a given action that the agent is capable of performing in the private networking environment. For instance, the checksums may be included with the action definitions in the queue, and upon receiving an action definition from the queue, an agent may compare its own code for performing an action indicated by the action definition to the checksum included with the action definition. Thus, the service and the agent may mutually ensure that the only actions performed within the private networking environment by the agent are specifically directed by the service and are performed according to code that is auditable and has not changed since the agent was instantiated.

According to certain embodiments, as described in more detail below with respect to FIG. 2, the agents do not directly retrieve data from the queue, but do so via a proxy component. For example, there may be a large number of agents, and assigning separate credentials to each agent for accessing the queue may create scalability issues (e.g., due to limits on numbers of credentials that may be assigned for a given queue per requirements of some queueing services). Thus, a credential may be assigned to the proxy component for accessing the queue, and requests from all agents for data from the queue may be directed to the proxy component, which may then use its credential to retrieve the requested data from the queue and provide it to the requesting agent. A credential may, for example, refer to an identity assigned by an identity manager such as an Amazon® identity and access management (IAM)® service, which is a service that allows fine-grained control of application programming interface (API) access to an Amazon® Web Services (AWS)® account.

In some embodiments a group of agents (e.g., "agent group" or "worker group") within a private networking environment is assigned a shared queue, and actions added to the queue are distributed among the agents in the group. For example, the agents in the group may act in concert to perform actions added to the queue by the service, such as according to a parallel processing scheme. All of the agents in the group may access the queue via the common proxy component, which may use its credential to retrieve action definitions requested by all of the agents. Thus, agents may not need to be assigned separate credentials for accessing the queue.

Accordingly, techniques described herein allow for secure and scalable command control by remote services of operations within private networking environments. In one example, embodiments of the present disclosure allow a remediation service outside of a customer's networking environment to perform automated remediation of issues detected within the customer's networking environment via agents that are installed and trusted by the customer. For example, an administrator of the customer's networking environment may configure the networking environment to grant the agents access to resources needed to perform remediation activities, and may be able to inspect the code of the agents themselves to ensure that the agents are not configured to perform unauthorized activities. No permissions to access resources within the customer's networking environment need to be granted to the remote service to which the agents correspond, thereby avoiding security risks associated with granting such access to outside entities.

Furthermore, by distributing workload among a group of agents, embodiments of the present disclosure involve efficient utilization of physical computing resources in order to improve execution time and reduce load on individual processing devices (e.g., by distributing the agents across multiple processing devices).

It is noted that while certain examples are described with respect to a remediation service and to particular types of components, techniques described herein are applicable to many other types of services and components.

FIG. 1 illustrates an example related to inter-network command and control.

In illustration 100, a cloud 120 is connected to a private networking environment 150 via a network 110. Network 110 may, for example, be a wide area network (WAN) such as the Internet, or another type of connection over which data may be transmitted. Cloud 120 may, for example, be a cloud networking environment such as VMware® vCloud®, which may be associated with a cloud infrastructure service such as VMware® Cloud Director®. Private networking environment 150 may, for example, be a data center or a cloud computing environment. Components in cloud 120 and private networking environment 150, such as service 122, queue 124, application programming interface (API) gateway 126, and agents 162₁₋₃ may run on one or more physical computing devices with one or more processors, memory, and/or the like. In one example, as described in more detail below with respect to FIG. 3, private networking environment 150 may be a software-defined data center (SDDC). A client device 122 is also connected to network 110, and may represent a computing device (e.g., desktop or laptop computer, mobile device, and/or the like) by which a user accesses resource running in private networking environment 150 and/or cloud 120, such as via a web browser or other application.

In one example, private networking environment 150 is a secure environment in which resources such as applications and data of an organization or individual are located, and access to resources in private networking environment 150 is restricted (e.g., using one or more security mechanisms such as firewalls, access control components, and/or the like). A user such as an administrator of private networking environment 150 may wish to utilize a remote service to perform certain functionality within private networking environment 150.

For example, a service 122 running in cloud 120 may provide functionality that is useful for private networking environment 150, such as detection and/or remediation of issues within private networking environment 150. Thus, techniques described herein involve installing one or more agents, such as agents 162₁₋₃, of service 122 within private networking environment 150, and controlling execution of operations by agents 162₁₋₃ in a secure and scalable manner.

In particular, agents 162₁₋₃ are software components that form an agent group 160 for performing operations on behalf of service 122 within private networking environment 150. In one example implementation, agents 162₁₋₃ are containers or other types of virtual computing entities (VCIs) that run on one or more physical host computers. Agent group 160 is a logical construct for efficient distribution of operations among agents 162₁₋₃, such as via a parallel processing scheme.

In one example, service 122 generates one or more secure tokens, and provides the one or more secure tokens to a user of private networking environment 150. The user may enter the one or more secure tokens when installing agents 162₁₋3, and each agent 162 may, upon instantiation, provide a secure token to service 122 for authentication. If the token received by service 122 from a given agent 162 is authenticated, then agent 162 may be allowed to launch. Otherwise, if the token is not successfully authenticated, the agent 162 may be prevented from launching or otherwise prevented from performing operations and/or communicating with service 122 and/or its associated components.

Upon instantiation, each agent 162 may also send its code to service 122, and service 122 may generate a checksum of each method within the code, associating the checksums with action definitions corresponding to the methods. These checksums may provide auditability and may be used at a later point to ensure that any code that is executed by an agent 162 within private networking environment 150 has not been modified since the agent 162 was first instantiated.

Service 122 may create agent group 160 as a logical construct for performing operations within private networking environment 150 via agents 162₁₋3. In some embodiments, service 122 creates queue 124 for use in communicating commands for performing operations to agents 162₁₋3. For instance, queue 124 may be created specifically for agent group 160, and may be created using a queue service such as Amazon® Simple Queue Service (SQS)®. While service 122 may potentially grant credentials (e.g., identities) to each agent 162 for accessing queue 124, this may create scalability issues due to the limited number of identities allowed by certain queue services. As such, service 122 may provide a credential (e.g., identity) for accessing queue 124 to a proxy component on cloud 120 (e.g., located in API gateway 126), and agents 162 may access the queue via the proxy component. Such a proxy component is described in more detail below with respect to FIG. 3. Service 122 may also grant credentials for accessing the queue service to one or more other components running on cloud 120 (not shown), such as components for creating queues, adding data to queues, removing data from queues, and/or the like.

API gateway 126 may receive all requests directed to an API provided by service 122 and/or the queue service to which queue 124 corresponds, and may direct all such requests to an appropriate component. For example, agents 162 may communicate with service 122 and/or queue 124 via API calls, and these calls may be received by API gateway 126 and routed to an appropriate component.

While not shown, additional networking environments may also be connected to network 110, and additional agents of service 122 may be installed in these networking environments. For example, one or more agent groups may be installed in each networking environment, and one or more queues may be created for each agent group.

Figure 2:
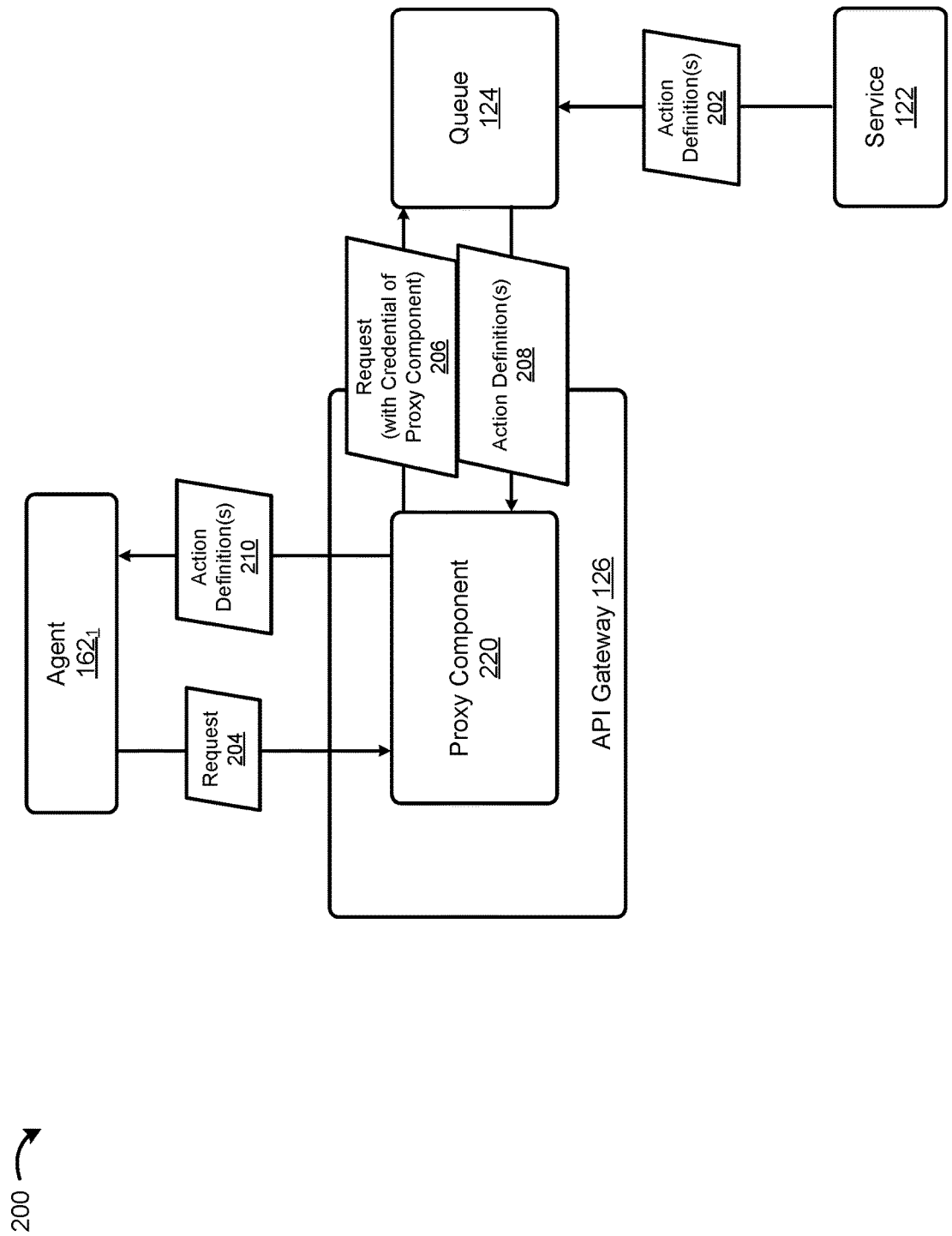
FIG. 2 illustrates another example related to inter-network command and control.

FIG. 2 illustrates another example related to inter-network command and control. Illustration 200 includes service 122, queue 124, API gateway 126, and agent 162₁ of FIG. 1. For example, agent 162₁ may have been instantiated within a private networking environment as described above.

Service 122 provides one or more action definitions 202 to queue 124. For example, action definitions 202 may represent one or more actions that service 122 is requesting to be performed in the private networking environment by one or more agents in an agent group. In one example, action definitions 202 include identifiers of methods and/or checksums of code within agents corresponding to specific actions that service 122 is requesting to be performed. By placing action definitions 202 in queue 124 (e.g., rather than sending instructions to perform the actions directly to the agents), techniques described herein allow service 122 to perform command and control with respect to the agents in the private networking environment without requiring ports in the private networking environment to be opened for service 122 to communicate with the agents, thereby improving security.

An example of an action indicated by action definitions 202 includes closing a port that was determined to be open (e.g., posing a security risk). For example, a finding component on cloud 120 may scan private networking environment 150 for open ports and, if it determines that a port is open that should not be open, instructs service 122 (e.g., a remediation service) to close the port. Thus, service 122 may place an action definition for closing the port in queue 124 to be retrieved and executed by an agent.

Agents may retrieve action definitions whenever they have capacity to perform actions. For example, agent 1621 sends a request 204 (e.g., an API request) for retrieving one or more action definitions, and the request may be received by API gateway 126. API gateway 126 determines that request relates to queue 124, and routes request 204 to proxy component 220 accordingly.

Proxy component 220 is a software component that serves as an interface between agents and queue 124, and has been assigned a credential for accessing queue 124. Upon receiving request 204, proxy component 220 sends a request 206 to queue 124, including the credential of proxy component 220 in the request 206. Queue 124 validates the credential and responds to request 206 with one or more action definitions 208 from queue 124. In some embodiments, each agent only retrieves one action definition at a time, and does not retrieve a subsequent action definition until it completes an action corresponding to the action definition it has most recently retrieved.

Proxy component 220 returns one or more action definitions 210 to agent 1621 (e.g., which are the one or more action definitions 208 that were returned from queue 124 to proxy component 220).

Agent 1621 receives the one or more action definitions 210 and determines whether to perform actions corresponding to the one or more action definitions. For instance, a checksum of code for a given action may be included with a given action definition 210, and agent 1621 may determine whether the checksum is consistent with its code for performing the action. If the checksum is not consistent with the code, then agent 1621 may determine not to execute the code, such as generating an error message indicating that the action could not be performed. In some embodiments, such an error message indicates that the code for performing the action could not be successfully validated so that an administrator may investigate the issue.

When an agent retrieves an action definition from the queue, that action definition may be locked in the queue for a given amount of time (e.g., so that the action is not pulled and performed by other agents), and may be removed from the queue once the action has been completed. For example, once agent 1621 performs the action, it may signal that it has completed the action, such as via an API call received by API gateway 126 and directed to a removal component that removes items from queue 124 using a credential assigned to the removal component for removing items from queue 124. In some embodiments, if agent 1621 is unable to successfully authenticate its code for performing the operation (e.g., if the code is inconsistent with the checksum received with the action definition 210), agent 1621 may signal that it is unable to complete the action, such as via an API call received by proxy component 220 and routed to queue 124. Queue 124 may unlock the action definition 210 if it determines that agent 1621 was unable to perform the action.

In an example, agent 1621 performs the action indicated by an action definition 210 by executing code within agent 1621 for performing the action, such as closing a port that was determined to be inadvertently open.

In some embodiments, agents request action definitions and perform actions in a greedy fashion. For example, every time an agent has capacity to perform an action (e.g., after completing an action), it may request the next action definition from the queue. Thus, the agents may act in concert to efficiently perform the actions indicated by action definitions 202 in queue 124.

Advantageously, by relying on a credential of proxy component 220 (e.g., instead of individual credentials for each agent) for retrieving action definitions from queue 124, techniques described herein avoid exceeding limits on numbers of credentials imposed by certain queue services and improve security by generating and transmitting fewer credentials for accessing lueue 124.

Figure 3:
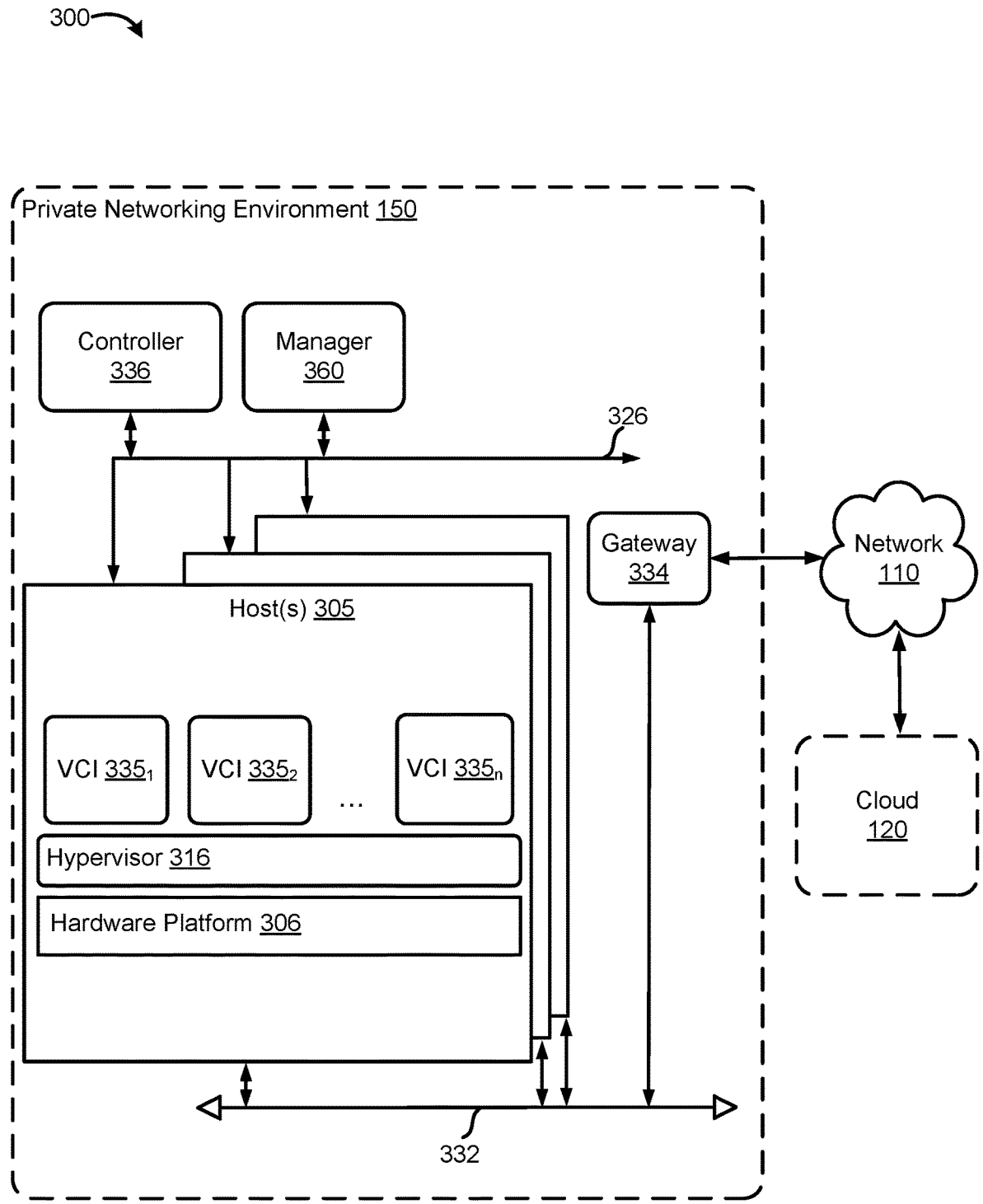
FIG. 3 illustrates an example of physical and virtual computing components with which embodiments of the present disclosure may be implemented.

FIG. 3 depicts example physical and virtual network components with which embodiments of the present disclosure may be implemented.

Networking environment 300 includes private networking environment 150 and cloud 120 of FIG. 1 connected to network 110 of FIG. 1.

Private networking environment 150 generally represents a set of networked machines and may comprise a logical overlay network. In some embodiments, private networking environment 150 is a software-defined data center (SDDC). Private networking environment 150 includes host(s) 305, a gateway 334, a data network 332, which may be a Layer 3 network, and a management network 326. Host(s) 305 may be an example of machines. Data network 332 and management network 326 may be separate physical networks or different virtual local area networks (VLANs) on the same physical network.

Cloud 120 is also connected to network 110. In some embodiments, cloud 120 comprises service 122, queue 124, and API gateway 126 of FIG. 1.

It is noted that, while not shown, additional networking environments such as data centers and/or clouds may also be connected to network 110. Communication between the different data centers and/or clouds may be performed via gateways or corresponding components associated with the different data centers and/or clouds.

Each of hosts 305 may include a server grade hardware platform 306, such as an x86 architecture platform. For example, hosts 305 may be geographically co-located servers on the same rack or on different racks. Host 305 is configured to provide a virtualization layer, also referred to as a hypervisor 316, that abstracts processor, memory, storage, and networking resources of hardware platform 306 for multiple virtual computing instances (VCIs) 335$i$ to 335$n$ (collectively referred to as VCIs 335 and individually referred to as VCI 335) that run concurrently on the same host. VCIs 335 may include, for instance, VMs, containers, virtual appliances, and/or the like. VCIs 335 may be an example of machines. In certain embodiments, agents 162 of FIG. 1 may be included in VCIs 335 (e.g., agents 162 of FIG. 1 may be containers that run on one or more of hosts 305).

In certain aspects, hypervisor 316 may run in conjunction with an operating system (not shown) in host 305. In some embodiments, hypervisor 316 can be installed as system level software directly on hardware platform 306 of host 305 (often referred to as "bare metal" installation) and be conceptually interposed between the physical hardware and the guest operating systems executing in the virtual machines. It is noted that the term "operating system," as used herein, may refer to a hypervisor. In certain aspects, hypervisor 316 implements one or more logical entities, such as logical switches, routers, etc. as one or more virtual entities such as virtual switches, routers, etc. In some implementations, hypervisor 316 may comprise system level software as well as a "Domain 0" or "Root Partition" virtual machine (not shown) which is a privileged machine that has access to the physical hardware resources of the host. In this implementation, one or more of a virtual switch, virtual router, virtual tunnel endpoint (VTEP), etc., along with hardware drivers, may reside in the privileged virtual machine.

Gateway 334 provides VCIs 335 and other components in private networking environment 150 with connectivity to network 110, and is used to communicate with destinations external to private networking environment 150, such as cloud 120. Gateway 334 may be implemented as one or more VCIs, physical devices, and/or software modules running within one or more hosts 305.

Controller 336 generally represents a control plane that manages configuration of VCIs 335 within private networking environment 150. Controller 336 may be a computer program that resides and executes in a central server in private networking environment 150 or, alternatively, controller 336 may run as a virtual appliance (e.g., a VM) in one of hosts 305. Although shown as a single unit, it should be understood that controller 336 may be implemented as a distributed or clustered system. That is, controller 336 may include multiple servers or virtual computing instances that implement controller functions. Controller 336 is associated with one or more virtual and/or physical CPUs (not shown). Processor(s) resources allotted or assigned to controller 336 may be unique to controller 336, or may be shared with other components of private networking environment 150. Controller 336 communicates with hosts 305 via management network 326.

Manager 360 represents a management plane comprising one or more computing devices responsible for receiving logical network configuration inputs, such as from a network administrator, defining one or more endpoints (e.g., VCIs and/or containers) and the connections between the endpoints, as well as rules governing communications between various endpoints. In one embodiment, manager 360 comprises one or more computer programs that execute in a central server in networking environment 300, or alternatively, may run in one or more VMs, e.g. in one or more of hosts 305. In certain embodiments, manage 360 is configured to receive inputs from an administrator or other entity, e.g., via a web interface or API, and carry out administrative tasks for private networking environment 150, including centralized network management and providing an aggregated system view for a user. In some embodiments, manager 360 provides an interface to hardware platform 306, and is configured to carry out various tasks to manage virtual computing resources. For example, manager 360 may be able to deploy VCIs in private networking environment 150 and/or perform other administrative tasks with respect to VCIs.

Figure 4:
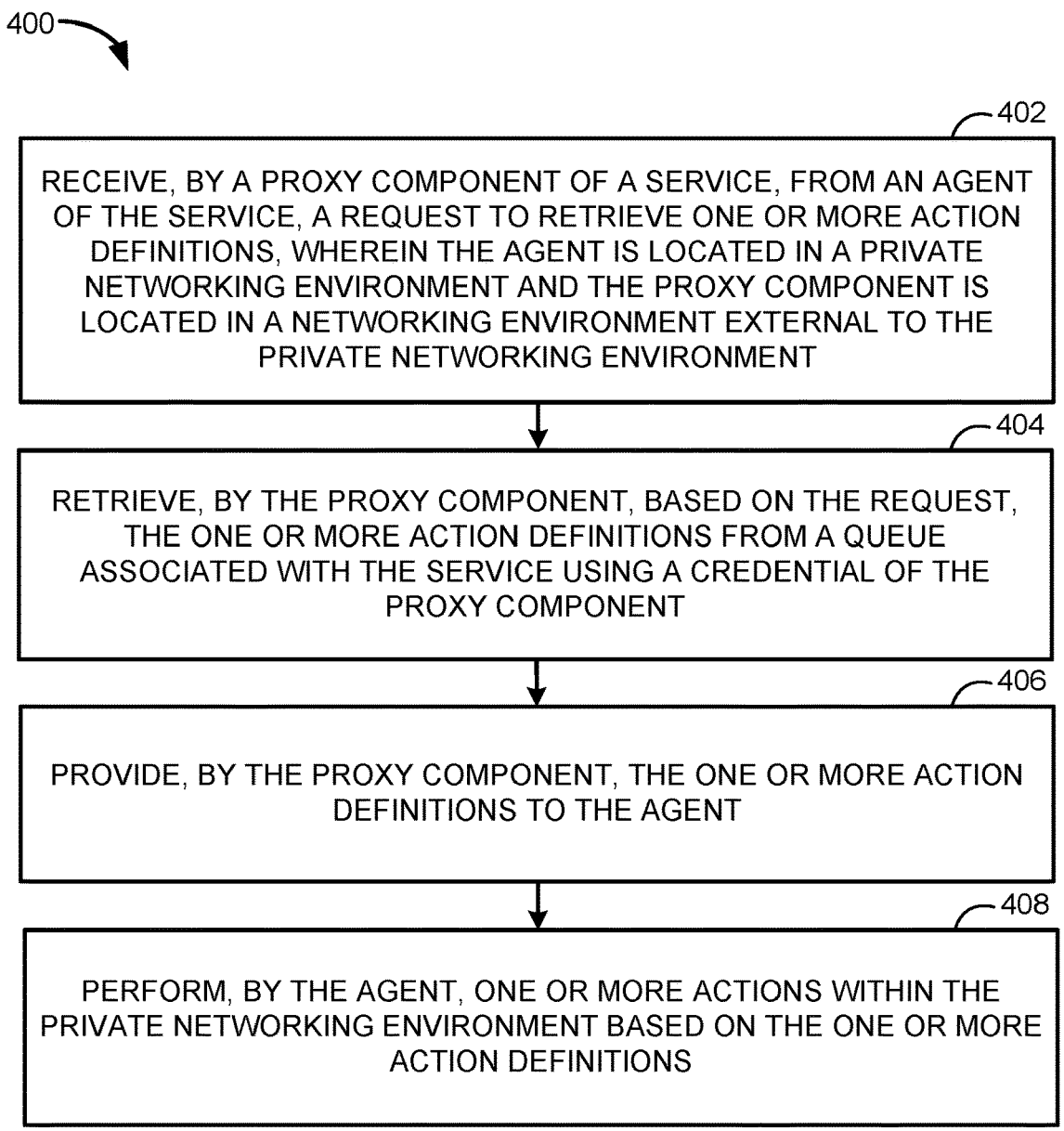
FIG. 4 depicts example operations related to inter-network command and control.

FIG. 4 depicts example operations 400 related to inter-network command and control. For example, operations 400 may be performed by one or more components of private networking environment 150 and/or cloud 120 of FIG. 1 and/or one or more of the components described with respect to FIGS. 2 and 3.

Operations 400 begin at step 402, with receiving, by a proxy component of a service, from an agent of the service, a request to retrieve one or more action definitions. In some embodiments, the agent is located in a private networking environment and the proxy component is located in a networking environment external to the private networking environment. For example, the networking environment external to the private networking environment may be a public cloud, a private cloud, a data center, or another type of networking environment.

In certain embodiments, the agent is authenticated by the service via a token provided by the worker component. For example, certain embodiments comprise providing, by the agent, a token to the service for authenticating the agent.

In some embodiments, the request is received by the proxy component via an application programming interface (API) gateway associated with the service. For example, the API gateway may receive the request and forward it to the proxy component. In certain embodiments, the proxy component runs within the API gateway.

Operations 400 continue at step 404, with retrieving, by the proxy component, based on the request, the one or more action definitions from a queue associated with the service using a credential of the proxy component.

Operations 400 continue at step 406, with providing, by the proxy component, the one or more action definitions to the agent.

In certain embodiments, the one or more action definitions comprise one or more checksums, and the agent determines whether code of the agent for performing the one or more actions is consistent with the one or more checksums. For example, the service may generate the one or more checksums based on one or more sections of code sent by the agent to the service (e.g., upon instantiation of the agent within the private networking environment).

Operations 400 continue at step 408, with performing, by the agent, one or more actions within the private networking environment based on the one or more action definitions. For example, the private networking environment may be configured to allow the agent to access one or more resources in the private networking environment and to deny direct access to the service to the one or more resources. In some embodiments, performing, by the agent, the one or more actions is based on determining that the code of the agent for performing the one or more actions is consistent with the one or more checksums.

In certain embodiments, the agent is part of an agent group, and the agent group comprises a plurality of agents that run in the private networking environment. For example, actions related to the service may be distributed across the plurality of agents in the agent group. In certain embodiments, the queue was created specifically for the agent group. For example, certain embodiments include receiving, by the proxy component, from a separate agent that is part of a separate agent group, a separate request to access one or more respective action definitions and retrieving, by the proxy component, based on the separate request, the one or more respective action definitions from a separate queue corresponding to the separate agent group using a corresponding credential of the proxy component.

Some embodiments further comprise receiving, by the proxy component, from an additional agent of the plurality of agents, an additional request to access one or more additional action definitions. Certain embodiments further comprise retrieving, by the proxy component, based on the additional request, the one or more additional action definitions from the queue using the credential of the proxy component.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and/or the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of inter-network command and control, comprising:
   receiving, by a proxy component of a remediation service, from an agent, a request to retrieve one or more action definitions, wherein:
      the agent is located in a private networking environment having located therein one or more agents, the one or more agents comprising the agent;
      each of the one or more action definitions corresponds to one of a plurality of actions to be performed within the private networking environment by the one or more agents to remediate one or more issues detected within the private networking environment; and the proxy component is located in a networking environment external to the private networking environment;

receiving, by the proxy component and from the agent, a token to the remediation service for authenticating the agent;

retrieving, by the proxy component, based on the request, the one or more action definitions from a queue associated with the remediation service using a credential of the proxy component;

providing, by the proxy component, the one or more action definitions to the agent wherein the one or more action definitions cause the agent to perform one or more of the plurality of actions within the private networking environment based on the one or more action definitions.

2. The method of claim 1, wherein the request is received by the proxy component via an application programming interface (API) gateway associated with the remediation service.

3. The method of claim 1, wherein the one or more agents are part of an agent group, and wherein the agent group comprises a plurality of agents that run in the private networking environment.

4. The method of claim 1, further comprising authenticating the agent via the token.

5. The method of claim 1, wherein the private networking environment is configured to allow the agent to access one or more resources in the private networking environment and to deny direct access to the remediation service to the one or more resources.

6. The method of claim 1, wherein the one or more action definitions comprise one or more checksums corresponding to code of the agent for performing the one or more actions is consistent with the one or more checksums.

7. The method of claim 6, further comprising generating, by the remediation service, the one or more checksums based on one or more sections of code sent by the agent to the service.

8. The method of claim 6, wherein the one or more action definitions cause the agent to perform the one or more actions only if the code of the agent for performing the one or more actions is consistent with the one or more checksums.

9. A system for inter-network command and control, the system comprising:
one or more processors; and
one or more non-transitory computer-readable media storing instructions executable by the one or more processors to perform operations comprising:
receiving, by a proxy component of a remediation service, from an agent, a request to retrieve one or more action definitions, wherein:
the agent is located in a private networking environment having located therein one or more agents, the one or more agents comprising the agent;
each of the one or more action definitions corresponds to one of a plurality of actions to be performed within the private networking environment by the one or more agents to remediate one or more issues detected within the private networking environment; and
the proxy component is located in a networking environment external to the private networking environment;

receiving, by the proxy component and from the agent, a token to the remediation service for authenticating the agent;

retrieving, by the proxy component, based on the request, the one or more action definitions from a queue associated with the remediation service using a credential of the proxy component;

providing, by the proxy component, the one or more action definitions to the agent
wherein the one or more action definitions cause the agent to perform one or more of the plurality of actions within the private networking environment based on the one or more action definitions.

10. The system of claim 9, wherein the request is received by the proxy component via an application programming interface (API) gateway associated with the remediation service.

11. The system of claim 9, wherein the one or more agents are part of an agent group, and wherein the agent group comprises a plurality of agents that run in the private networking environment.

12. The system of claim 9, wherein operations further comprise authenticating the agent via the token.

13. The system of claim 9, wherein the private networking environment is configured to allow the agent to access one or more resources in the private networking environment and to deny direct access to the remediation service to the one or more resources.

14. The system of claim 9, wherein the one or more action definitions comprise one or more checksums corresponding to code of the agent for performing the one or more actions is consistent with the one or more checksums.

15. The system of claim 14, wherein the operations further comprise, generating, by the service, the one or more checksums based on one or more sections of code sent by the agent to the service.

16. One or more non-transitory computer-readable media storing instructions executable by the one or more processors to perform operations comprising:
receiving, by a proxy component of a remediation service, from an agent, a request to retrieve one or more action definitions, wherein:
the agent is located in a private networking environment having located therein one or more agents, the one or more agents comprising the agent;
each of the one or more action definitions corresponds to one of a plurality of actions to be performed within the private networking environment by the one or more agents to remediate one or more issues detected within the private networking environment; and
the proxy component is located in a networking environment external to the private networking environment;

receiving, by the proxy component and from the agent, a token to the remediation service for authenticating the agent;

retrieving, by the proxy component, based on the request, the one or more action definitions from a queue associated with the remediation service using a credential of the proxy component;

providing, by the proxy component, the one or more action definitions to the agent wherein the one or more action definitions cause the agent to perform one or more of the plurality of actions within the private networking environment based on the one or more action definitions.

17. The one or more non-transitory computer-readable media of claim 16, wherein the request is received by the proxy component via an application programming interface (API) gateway associated with the remediation service.

18. The one or more non-transitory computer-readable media of claim 16, wherein the one or more action definitions comprise one or more checksums corresponding to code of the agent for performing the one or more actions is consistent with the one or more checksums.

19. The one or more non-transitory computer-readable media of claim 18, further comprising generating, by the remediation service, the one or more checksums based on one or more sections of code sent by the agent to the service.

20. The one or more non-transitory computer-readable media of claim 19, wherein the one or more action definitions cause the agent to perform the one or more actions only if the code of the agent for performing the one or more actions is consistent with the one or more checksums.

\* \* \* \* \*